United States Patent Office 3,464,810
Patented Sept. 2, 1969

3,464,810
PROCESS FOR PRODUCING FLAKED SODIUM METABORATE COMPOSITIONS
John T. Young, Long Beach, and Paul F. Jacobs, Orange, Calif., assignors to United States Borax & Chemical Corporation, Los Angeles, Calif., a corporation of Nevada
No Drawing. Continuation-in-part of application Ser. No. 304,612, Aug. 26, 1963. This application Oct. 22, 1965, Ser. No. 502,504
The portion of the term of the patent subsequent to Apr. 21, 1981, has been disclaimed
Int. Cl. A01n 9/22; C01b 35/00
U.S. Cl. 71—82         19 Claims

ABSTRACT OF THE DISCLOSURE

Solid flakes of sodium metaborate having at least about 3.5 moles of water of hydration are prepared by combining sodium tetraborate and sodium hydroxide in the presence of added free water sufficient to provide a product having at least about 3.5 moles of water of hydration, heating the combination at an elevated temperature of about 75° to about 105° C. to form a fluid plastic-like mass and then feeding this mass to a cooled drum flaker. Optionally, sodium chlorate and/or an organic herbicide can be included in the composition and forms a flaked product of sodium metaborate cocrystallized with sodium chlorate and/or organic herbicide.

---

This is a continuation in part of our copending application Ser. 304,612, filed Aug. 26, 1963, now abandoned.

This invention relates to an improved process for producing sodium metaborate and, more particularly, to the production of solid flakes of sodium metaborate and sodium metaborate-sodium chlorate compositions having at least about 3.5 moles of water of hydration.

Sodium metaborate compositions, and especially sodium metaborate combined with sodium chlorate, are known to be useful as herbicides and find many applications in soil sterilization of industrial property, such as railway rights of way, utility and petroleum refinery property. The herbicide compositions are applied either as an aqueous solution or as a solid granular material. The solid granular material has many obvious advantages in ease of application and handling, but the presence of fine, dusty material in the product is unsatisfactory. It has been suggested in the art to prepare granular sodium metaborate compositions, but such processes are relatively slow and produce products which have undesirable properties. Also, our copending application Ser. No. 86,336, filed Feb. 1, 1961, now Patent No. 3,130,036, discloses and claims a process for making flaked sodium metaborate compositions having less than four moles of water of hydration. This process produces a desirable product, but in some applications sodium metaborate products having about four or more moles of water of hydration are preferred.

It is therefore an object of this invention to provide a facile process for producing sodium metaborate having at least about 3.5 moles of water of hydration in a commerically desirable form.

It is a further object of this invention to provide a process for producing solid flakes of sodium metaborate-sodium chlorate compositions having at least about 3.5 moles of water of hydration.

It is also an object of this invention to provide a process for producing solid flakes of sodium metaborate compositions containing organic herbicides as added ingredients.

Other objects of this invention will be obvious from the followng description.

There is provided by the present invention a process for producing solid flakes of sodium metaborate having at least about 3.5 moles of water of hydration which comprises combining sodium tetraborate and sodium hydroxide in a molar ratio of about 1:2, in the presence of added free water in an amount sufficient to forms sodium metaborate having at least about 3.5 moles of water of hydration, heating the resulting combination to an elevated temperature in the range of about 75° C. to about 105° C. to form a fluid, plastic-like reaction mass, feeding said reaction mass to a cooled drum flaker, and removing said sodium metaborate from said flaker.

The reaction can be illustrated by the following equation in which the borate water of hydration is omitted for simplicity:

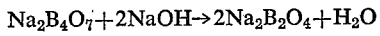

$$Na_2B_4O_7 + 2NaOH \rightarrow 2Na_2B_2O_4 + H_2O$$

The flaked sodium metaborate produced by the present process has at least about 3.5 moles, such as from about 3.5 to about 8 moles, of water of hydration. We prefer a product having from about 3.5 to about 5.5 moles of water of hydration.

Sodium tetraborate, which is a reactant in the process, is well known to those skilled in the art as borax, when in the decahydrate form. The other hydrated forms of sodium tetraborate having, for example, two, four, five, eight or ten moles of water of hydration can also be used in the present process. In the preferred embodiment of our invention we use the pentahydrate of sodium tetraborate.

The amount of added free water will be determined by the amount of water of hydration desired in the final product, as well as the amount of water available from the hydrated sodium tetraborate used as a reactant. Normally, since there is some evaporation of water due to heating the reactants to an elevated temperature, we preferably add a slight excess of water to make up the deficiency. Thus, when sodium tetraborate pentahydrate is a reactant, from about 1 to about 5 moles of free water are required for each mole of sodium tetraborate pentahydrate.

About two moles of sodium hydroxide are required for each mole of sodium tetraborate. Preferably, a sodium hydroxide:sodium tetraborate molar ratio of from 1.80 to 1.99:1 is used. By employing such preferred ratio, the resultant product has a much less tendency to cake. For ease of handling and economy, an aqueous solution of sodium hydroxide, such as about 50–70% sodium hydroxide, is preferred.

In a preferred embodiment of this invention, the sodium tetraborate is combined with sodium hydroxide which has been dissolved in the required amount of added free water and the mixture of reactants is stirred and heated to the reaction temperature by application of external heat. Some heat is evolved upon merely mixing the reactants at ambient temperature, but we have found that the mixture must be heated by external means so as to reach the desired reaction temperature and produce the fluid, plastic-like mass. At the elevated reaction temperature, the reaction mass becomes a fluid, plastic-like composition in about 1 to 2 minutes and it can then be easily applied to the cooled drum flaker. If the reactants are heated to too high a temperature, such as above about 105° C., it will become a thin liquid which is unsuitable for feeding to the cooled drum flaker. The plastic mass solidifies on the drum flaker and is easily removed therefrom by appropriate scraper means. The product is in the form of thick, solid flakes having a very small proportion of undesirable fine, dusty material. The process is extremely fast, requiring only one to about four minutes from initial mixing to removal from the flaker. It is also well suited to continuous operation wherein the ingredients are continuously admixed and reacted at the elevated temperature and continuously applied to a cooled drum flaker at a predetermined rate.

The reactants will form the required fluid, plastic-like reaction mass when heated at a temperature in the range of about 75° C. to about 105° C., the exact temperature being somewhat dependent upon the amount of free water present. We prefer a temperature of about 93° C. to about 102° C. for a product having about four moles of water of hydration.

The cooled drum flaker employed in the process is a conventional drum flaker apparatus, with the double drum flaker being especially useful. When the double drum flaker is used, the plastic-like reaction mass is fed to the "pinch" between the two rotating drums. A drum clearance of about 0.042 to about 0.062 inch and drum rotation rate of about 5 to 12 r.p.m. gives an excellent product at a high rate of production. The drum is cooled by conventional means, such as circulation of cooled water or similar cooling media through the inside of the drums. The drum surface should be cooled to a temperature of at least below about 50° C., and preferably in the range of about 10° C. to about 35° C.

The present invention also provides a process for the direct preparation of solid, flaked cocrystallized sodium metaborate-sodium chlorate compositions which do not segregate on standing. Sodium chlorate is a desirable material for herbicide compositions since it provide a rapid killing action; however, when applied alone, whether in solution or as a solid, it presents an extreme fire hazard when it becomes relatively dry and in contact with organic matter. To reduce the fire danger to a safe level, sodium chlorate herbicide compositions therefore must contain an active fire retardant. Sodium metaborate, in addition to being an excellent herbicide, is also well known as a fire retardant. Thus, the combination with chlorate results in a non-hazardous herbicidal composition having a quick killing action due to the chlorate and a prolonged killing action due to the borate.

The borate and sodium chlorate, being of different densities, tend to separate on standing and localized high concentrations of the sodium chlorate present a fire hazard. However, by using the process of the present invention, a cocrystallized product is obtained which does not segregate on standing.

The proportions of the metaborate and chlorate used in the herbicidal compositions may be varied, depending largely upon the amount of fire protection and length of herbicidal activity desired. Compositions containing from about 15 percent to about 60 percent sodium chlorate and from about 85 percent to about 40 percent metaborate comprise excellent water-soluble herbicides, which present no fire hazards.

The sodium metaborate-sodium chlorate compositions are prepared substantially in the same manner as described in the preparation of metaborate alone. Sodium tetraborate and the desired amount of sodium chloride are combined in the reaction vessel and the required amount of sodium hydroxide dissolved in water is then added. The reaction mass is heated to the desired elevated reaction temperature to form the fluid plastic mass, which is then placed on the cooled drum flaker where it solidifies, and the product is recovered as solid flakes of cocrystallized sodium chlorate-sodium metaborate.

In addition to the preparation of metaborate-chlorate compositions, the process of the present invention is also ideally suited for preparing compositions containing other desirable ingredients. For example, the process can be used to prepare metaborate compositions containing one or more added organic herbicides wherein the ingredients do not separate or segregate upon standing. The organic herbicides can be added to the metaborate alone, or can be added to the metaborate-chlorate combinations. In producing compositions containing organic material in combination with the metaborate-chlorate, the organic material should be added to the reaction vessel after the sodium chlorate has been thoroughly mixed with the sodium tetraborate. This method of adding the organic constituent after the chlorate is well mixed with the borate is done to prevent any possible violent reaction between the chlorate and the organic herbicide. The process is then carried out in the same manner described for the preparation of the metaborate-chlorate compositions. The organic herbicides which can be incorporated in the process are those which will not decompose at the reaction temperature. They are preferably used in amounts of from 0.25 to about 18 percent by weight of one or more organic herbicides, based on the total weight of the composition. The proportion of inorganic constituent used is the same whether metaborate is used alone or in combination with the chlorate. Typical examples of organic herbicides which can be incorporated are the substituted uracils, substituted ureas, halophenoxy acetic acids, halogenated benzoic acids, substituted triazines, aminotriazole, carbamates, and halogenated aliphatic acids, such as dichloropropionic acid. Other organic herbicides well known to those skilled in the art can be used as long as they have a decomposition point higher than the elevated reaction temperatures.

The following examples are presented to illustrate the process of the present invention, but are not intended to limit the invention to the specific examples given.

Example I

Three hundred pounds of sodium borate pentahydrate were thoroughly mixed with two hundred pounds of sodium chlorate. The mixture was continuously fed at a rate of 1938 pounds per hour to an agitated reactor-mixer and simultaneously a 50% aqueous solution of sodium hydroxide was introduced at a rate of 642 pounds per hour into the reactor in a molar ratio of about two moles of sodium hydroxide to one mole of sodium tetraborate. The reactants were maintained at a temperature of about 95° C. by external steam applied to the reactor jacket. The fluid, plastic-like reaction mass was continuously discharged from the reactor and fed to the pinch of a double drum flaker cooled with circulating 23° C. water. The flaker had a drum clearance of 0.060 inch and the drums rotated at a rate of 12 r.p.m. After a retention time of 1.67 seconds, the solid flakes of product were removed from the flaker by a scraper knife and cooled to room temperature. A production rate of 137.2 pounds per hour per square foot of drum surface was obtained. The product had the following analyses:

| | Percent |
|---|---|
| $Na_2O$ | 19.9 |
| $B_2O_3$ | 22.4 |
| $NaClO_3$ | 29.4 |
| $H_2O$ (by difference) | 28.3 |

Formula:
$Na_2B_2O_4 \cdot 4.89H_2O \cdot 0.72NaClO_3$

Example II

The procedure of Example I was followed except that the feed did not contain sodium chlorate. 773 pounds per hour of sodium borate pentahydrate were continuously fed to the reactor-mixer and simultaneously a 50 percent aqueous solution of sodium hydroxide was added at a rate of 427 pounds per hour. The fluid plastic reaction mass was fed to the cooled drum flaker at a rate of 1200 pounds per hour. The flaker had a drum clearance of 0.050 inch and the drums rotated at a rate of 7.7 r.p.m. The solid flakes were removed as described above and cooled to room temperature.

Analysis:

| | Percent |
|---|---|
| $Na_2O$ | 28.2 |
| $B_2O_3$ | 31.7 |
| $H_2O$ (by difference) | 40.1 |

Formula:
$Na_2B_2O_4 \cdot 4.9H_2O$

Example III

Three hundred pounds of sodium borate pentahydrate were thoroughly mixed with two hundred pounds of sodium chlorate and 12.1 pounds of 5-bromo-3-sec.-butyl-6-methyl uracil. The mixture was continuously fed at a rate of 720 pounds per hour to the agitated reactor-mixer and simultaneously a 50% aqueous solution of sodium hydroxide was added at a rate of 240 pounds per hour. The fluid reaction mass was discharged from the reactor at a temperature of 95° C. and fed to the cooled drum flaker. The flaked product was removed and cooled to room temperature. The product had the following analyses:

| | Percent |
|---|---|
| $Na_2O$ | 20.6 |
| $B_2O_3$ | 22.4 |
| $NaClO_3$ | 27.6 |
| Uracil | 0.98 |
| Water (by difference) | 28.42 |

Formula:
$Na_2B_2O_4 \cdot 4.75H_2O \cdot 0.66NaClO_3 +$ uracil

Other modes of applying the principle of the invention may be employed, change being made as regards the details described, provided the features stated in any of the following claims or the equivalent of such be employed.

We, therefore, particularly point out and distinctly claim as our invention:

1. The process for producing solid flakes of sodium metaborate having at least about 3.5 moles of water of hydration which comprises combining sodium tetraborate and sodium hydroxide in a molar ratio of about 1:2 in the presence of added free water in an amount sufficient to form sodium metaborate having at least about 3.5 moles of water of hydration, heating the resulting combination to an elevated temperature in the range of about 75° C. to about 105° C. to form a fluid, plastic-like reaction mass, feeding said reaction mass to a cooled drum flaker and removing said sodium metaborate from said flaker.

2. The process of claim 1 in which said combination is heated to a temperature in the range of about 93° C. to about 102° C.

3. The process for producing solid flakes of sodium metaborate having from about 3.5 to about 5.5 moles of water of hydration which comprises combining sodium tetraborate and sodium hydroxide in a molar ratio of about 1:2 in the presence of added free water in an amount sufficient to form sodium metaborate having at least about 3.5 moles of water of hydration, heating the resulting combination to an elevated temperature in the range of about 75° C. to about 105° C. to form a fluid, plastic-like reaction mass, immediately feeding said reaction mass to a cooled double drum flaker and removing said sodium metaborate from said flaker.

4. The process of claim 3 in which said combination is heated to a temperature in the range of about 93° C. to about 102° C.

5. The process of claim 3 in which said sodium tetraborate is the pentahydrate thereof.

6. The process of claim 3 in which about 0.25 to about 18 percent by weight, based on the total weight of the composition, of an organic herbicide having a decomposition point higher than said elevated temperature is added to the reaction mass prior to heating, said organic herbicide being selected from the substituted uracils, substituted ureas, halophenoxyacetic acids, halogenated benzoic acids, substituted triazines, aminotriazole, carbamates and halogenated aliphatic acids.

7. The process of claim 6 in which said organic herbicide is 5-bromo-3-sec.-butyl-6-methyluracil.

8. The process for producing solid flakes of cocrystallized sodium metaborate-sodium chlorate having at least about 3.5 moles of water of hydration which comprises combining sodium tetraborate and sodium hydroxide in a molar ratio of about 1:2 with sodium chlorate in the presence of added free water in an amount sufficient to form a product having at least about 3.5 moles of water of hydration, heating the resulting combination to an elevated temperature in the range of about 75° C. to about 105° C. to form a fluid, plastic-like reaction mass, feeding said reaction mass to a cooled drum flaker and removing said sodium metaborate-chlorate from said flaker.

9. The process of claim 8 in which said combination is heated to a temperature in the range of about 93° C. to about 102° C.

10. The process of claim 8 in which about 0.25 to about 18 percent by weight, based on the total weight of the composition, of an organic herbicide having a decomposition point higher than said elevated temperature is added to said combination after combining said sodium tetraborate and sodium chlorate, said organic herbicide being selected from the substituted uracils, substituted ureas, halophenoxyacetic acids, halogenated benzoic acids, substituted triazines, aminotriazole, carbamates and halogenated aliphatic acids.

11. The process for producing solid flakes of cocrystallized sodium metaborate-sodium chlorate having from about 3.5 to about 5.5 moles of water of hydration which comprises combining sodium tetraborate pentahydrate and sodium hydroxide in a molar ratio of about 1:2 with about 15 to 60 percent sodium chlorate based on the total weight, in the presence of about 1 to about 5 moles of water for each mole of sodium tetraborate, heating the resulting combination to an elevated temperature in the range of about 93° C. to about 102° C. to form a fluid, plastic-like reaction mass, immediately feeding said reaction mass to a cooled double drum flaker and removing said sodium metaborate-chlorate from said flaker.

12. The process of claim 11 in which about 0.25 to about 18 percent by weight, based on the total weight of the composition, of an organic herbicide having a decomposition point higher than said elevated temperature is added to said combination after combining said sodium tetraborate and sodium chlorate, said organic herbicide being selected from the substituted uracils, substituted ureas, halophenoxyacetic acids, halogenated benzoic acids, substituted triazines, aminotriazole, carbamates and halogenated aliphatic acids.

13. The process according to claim 3 in which said sodium tetraborate and sodium hydroxide are combined in a molar ratio of 1:1.80–1.99.

14. The process according to claim 8 in which said sodium tetraborate and sodium hydroxide are combined in a molar ratio of 1:1.80–1.99.

15. The process according to claim 8 in which about 0.25 to about 18 percent by weight, based on the total weight of the composition, of 5-bromo-sec.-butyl-6-methyluracil is added to the reaction mass after said sodium chlorate is mixed with said sodium tetraborate.

16. The process according to claim 11 in which about 0.25 to about 18 percent by weight, based on the total weight of the composition, of 5-bromo-3-sec.-butyl-6-methyluracil is added to the reaction mass after said sodium chlorate is mixed with said sodium tetraborate.

17. The process according to claim 11 in which said sodium tetraborate and sodium hydroxide are combined in a molar ratio of 1:1.80–1.99.

18. Solid, nondusty, flaked cocrystallized sodium metaborate-sodium chlorate - 5 - bromo-3-sec.-butyl-6-methyluracil having from about 3.5 to about 8 moles of water of hydration, said 5 - bromo - 3 - sec.-butyl-6-methyluracil comprising 0.25 to about 18 percent by weight of the composition.

19. A composition according to claim 18 having from about 3.5 to about 5.5 moles of water of hydration.

References Cited

UNITED STATES PATENTS

| | | | |
|---|---|---|---|
| 2,904,423 | 9/1959 | Stone et al. | 71—128 |
| 3,374,083 | 3/1968 | Loux | 71—81 |
| 2,062,650 | 12/1936 | Hellmers | 23—59 |
| 2,886,425 | 5/1959 | Seibert | 23—59 XR |
| 3,032,405 | 5/1962 | Mitchell et al. | 23—59 XR |
| 3,130,036 | 4/1964 | Young et al. | 71—2.4 |
| 3,227,541 | 1/1966 | Crawford | 71—2.5 XR |

FOREIGN PATENTS 898,915  6/1962  Great Britain.

LEWIS GOTTS, Primary Examiner

G. HOLLRAH, Assistant Examiner

U.S. Cl. X.R.

23—50, 59; 71—83, 84, 128